(12) United States Patent
Gu

(10) Patent No.: US 9,459,509 B2
(45) Date of Patent: Oct. 4, 2016

(54) ELECTROCHROMIC STRUCTURE, METHOD AND DISPLAY APPARATUS

(71) Applicant: BOE TECHNOLOGY GROUP CO., LTD., Beijing (CN)

(72) Inventor: Xin Gu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 27 days.

(21) Appl. No.: 14/371,296

(22) PCT Filed: Nov. 13, 2013

(86) PCT No.: PCT/CN2013/087013
§ 371 (c)(1),
(2) Date: Jul. 9, 2014

(87) PCT Pub. No.: WO2014/169629
PCT Pub. Date: Oct. 23, 2014

(65) Prior Publication Data
US 2015/0338712 A1   Nov. 26, 2015

(30) Foreign Application Priority Data

Apr. 19, 2013 (CN) .......................... 2013 1 0136777

(51) Int. Cl.
*G02F 1/155* (2006.01)
*G02F 1/153* (2006.01)

(52) U.S. Cl.
CPC .............. *G02F 1/155* (2013.01); *G02F 1/153* (2013.01); *G02F 2001/1552* (2013.01)

(58) Field of Classification Search
CPC .............. G02F 2001/1515; G02F 2001/1552; G02F 1/03; G02F 1/155

USPC ...... 359/271, 274, 275, 270, 273; 349/1, 61, 349/69, 110, 139
See application file for complete search history.

(56) References Cited

U.S. PATENT DOCUMENTS

2003/0184692 A1* 10/2003 Nagae ............... G02F 1/133514
349/86
2005/0200937 A1* 9/2005 Weidner ................ B64C 1/1484
359/275

(Continued)

FOREIGN PATENT DOCUMENTS

| CN | 101201523 A | 6/2008 |
|---|---|---|
| CN | 101738810 A | 6/2010 |

(Continued)

OTHER PUBLICATIONS

International Search Report, International Preliminary Report on Patentability and Written Opinion of the International earching Authority of PCT/CN2013/087013 In Chinese, mailed Feb. 27, 2014.

(Continued)

*Primary Examiner* — Bumsuk Won
*Assistant Examiner* — William R Alexander
(74) *Attorney, Agent, or Firm* — Collard & Roe, P.C.

(57) ABSTRACT

An electrochromic structure, a method and a display apparatus. The electrochromic structure includes a display layer including a first substrate (9), a color layer (7) and a second substrate (5); and a background layer including a controllable layer (3) and a third substrate (1); and the display layer is over the background layer. The electrochromic structure has clear hierarchy and simple structure, and can be made into display devices of larger size.

15 Claims, 1 Drawing Sheet

(56) References Cited

U.S. PATENT DOCUMENTS

| | | |
|---|---|---|
| 2008/0137168 A1 | 6/2008 | Abe |
| 2008/0143930 A1* | 6/2008 | Jin .................. G02F 1/1323 349/96 |
| 2010/0002175 A1* | 1/2010 | Kim .................. G02F 1/13718 349/115 |
| 2012/0033286 A1 | 2/2012 | Yashiro et al. |
| 2012/0081775 A1* | 4/2012 | Ersman ................ G02F 1/155 359/270 |
| 2012/0140126 A1* | 6/2012 | Werth .............. B60R 11/0235 348/837 |
| 2014/0085578 A1 | 3/2014 | Gu et al. |

FOREIGN PATENT DOCUMENTS

| | | |
|---|---|---|
| CN | 102346343 A | 2/2012 |
| CN | 202404340 U | 8/2012 |
| CN | 102879946 A | 1/2013 |
| JP | 2009265271 A | 11/2009 |

OTHER PUBLICATIONS

Chinese Office Action of Chinese Application No. 201310136777.6, mailed Jan. 6, 2015 with English translation.
English Translation of the International Search Report of PCT/CN2013/087013, mailed Feb. 27, 2014.
English translation of the International Preliminary Report on Patentability and Written Opinion of the International Searching Authority of PCT/CN2013/087013, issued Oct. 20, 2015.

* cited by examiner

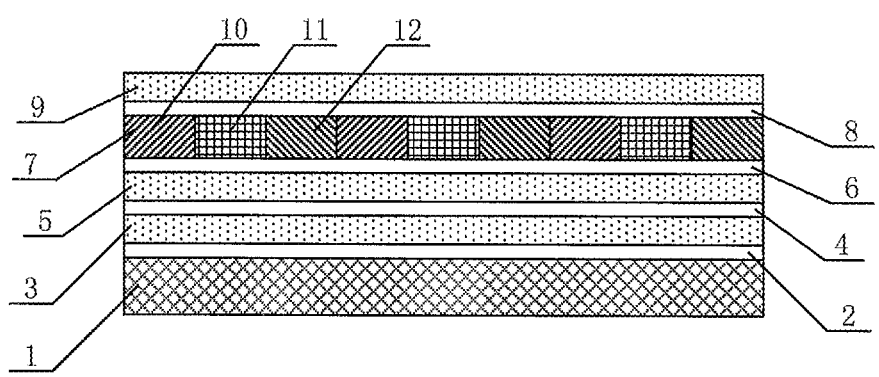

ELECTROCHROMIC STRUCTURE, METHOD AND DISPLAY APPARATUS

CROSS REFERENCE TO RELATED APPLICATIONS

This application is the National Stage of PCT/CN2013/087013 filed on Nov. 13, 2013, which claims priority under 35 U.S.C. §119 of Chinese Application No. 201310136777.6 filed on Apr. 19, 2013, the disclosure of which is incorporated by reference.

TECHNICAL FIELD

Embodiments of the present invention relate to an electrochromic structure, a method and a display apparatus.

BACKGROUND

Electrochromism refers to a phenomenon of reversible color change of a material's appearance due to a reversible change of light transmission or reflection resulted by oxidation or reduction under an action of external electric field. At present, applications of electrochromic materials mainly include electrochromic display devices, smart windows and glare-less rearview mirrors of automobiles.

Conventional electrochromic display devices (ECDs) are small in size and can not meet the demand for large size display. And the display modes of the conventional electrochromic display devices are the same as conventional displays, which can only display images or white screen, and the display functions are few only.

SUMMARY

To address the above-mentioned and other technical problems of prior art, an aspect of the present invention provides an electrochromic structure comprising: a display layer including a first substrate, a color layer and a second substrate; and a background layer including a controllable layer and a third substrate; wherein the display layer is over the background layer.

According to an example of the present invention, the display layer further comprises a first electrode layer provided between the first substrate and the color layer.

According to an example of the present invention, the first electrode layer includes electrode strips with a spacing therebetween.

According to an example of the present invention, the electrode strips are electrode strips of indium tin oxide semiconductor.

According to an example of the present invention, the display layer further comprises a first common electrode layer provided between the color layer and the second substrate.

According to an example of the present invention, the background layer further comprises a second common electrode layer provided between the controllable layer and the second substrate.

According to an example of the present invention, the controllable layer comprises an electrochromic material for displaying a conversion between white and colorlessness.

According to an example of the present invention, the background layer further comprises a second electrode layer provided between the controllable layer and the third substrate.

According to an example of the present invention, the color layer comprises color modules.

According to an example of the present invention, the color module comprises a red display unit, a green display unit and a blue display unit.

According to an example of the present invention, the red display unit comprises an electrochromic material for displaying red or colorlessness.

According to an example of the present invention, the green display unit comprises an electrochromic material for displaying green or colorlessness.

According to an example of the present invention, the blue display unit comprises an electrochromic material for displaying blue or colorlessness.

According to an example of the present invention, the first electrode layer comprises spaced electrode strips, and the electrode strips are provided corresponding to the red display unit, the green display unit and the blue display unit respectively.

According to another aspect of the present invention, a method of fabricating an electrochromic structure is provided. The method comprises: fabricating a first electrode layer on an side of a first substrate; fabricating a color layer on a first electrode layer; fabricating a first common electrode layer and a second common electrode layer on two sides of a second substrate respectively; attaching the first substrate and the second substrate to attach the color layer and the first common electrode layer together; fabricating a second electrode layer on a third substrate; fabricating a controllable layer on the second electrode layer; and attaching the second common electrode layer and the controllable layer.

According to an example of the present invention, fabricating of the color layer on the first electrode layer includes depositing a black matrix of a thickness on the first electrode layer; etching the black matrix into grooves with a width provided corresponding to the electrode strips; and injecting electrochromic materials into the grooves to form red display units, green display units and blue display units, so as to form the color layer.

According to yet another aspect of the present invention, a display apparatus is provided. The display apparatus comprises the electrochromic structure as mentioned above.

BRIEF DESCRIPTION OF THE DRAWINGS

Embodiments of the present invention will be described in more detail below with reference to the accompanying drawings to allow an of ordinary skill in the art to understand the present invention more clearly, in which:

FIG. 1 is a diagram of an electrochromic structure according to an embodiment of the present invention.

1—third substrate; 2—second electrode layer; 3—controllable layer; 4—second common electrode layer; 5—second substrate; 6—first common electrode layer; 7—color layer; 8—first electrode layer; 9—first substrate; 10—red display unit; 11—green display unit; 12—blue display unit.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments and variants can be obtained by those of ordinary skill in the art without creative labor and those embodiments and variants shall fall into the protection scope of the present invention.

Unless otherwise defined, all the technical and scientific terms used herein have the same meanings as commonly understood by one of ordinary skill in the art to which the present invention belongs. The terms, such as "first" "second" and the like, which are used in the description and the claims of the present application, are not intended to indicate any sequence, amount or importance, but for distinguishing various components. Also, the terms, such as "a/an," "one," "the/said" or the like, are not intended to limit the amount, but for indicating the existence of at lease one. The terms, such as "comprise/comprising," "include/including" or the like, are intended to specify that the elements or the objects stated before these terms encompass the elements or the objects and equivalents thereof listed after these terms, but not preclude other elements or objects. The terms, such as "On," "under," or the like, are only used to indicate relative position relationship, and when the position of the object which is described is changed, the relative position relationship may be changed accordingly.

Specific implementations of the present invention will be further described in details below with respect to the accompanying drawings and embodiments. In order to address the shortages of small size and few functions of conventional electrochromic display devices, embodiments of the present invention provide an electrochromic structure, a method and a display apparatus.

The electrochromic structure includes a display layer and a background layer; and the display layer is over the background layer.

1. Display Layer

The display layer includes a first substrate 9, a color layer 7 and a second substrate 5. The display layer further includes a first electrode layer 8 disposed between the first substrate 9 and the color layer 7. The display layer further includes a first common electrode layer 6 disposed between the color layer 7 and the second substrate 5. The color layer 7 includes color modules. The color module includes for example a red display unit 10, a green display unit 11 and a blue display unit 12 from left to right in turn. The sequence of the red display unit 10, the green display unit 11 and the blue display unit 12 may also vary. The color module may further contain display units of other colors. The number, arrangement and structures of display units in the color module can be set as required to accommodate various display circumstances. Such a structure arrangement improves the display precision, the color richness and the user's experience. The red display unit 10 includes an electrochromic material for displaying red or colorlessness. The green display unit 11 includes an electrochromic material for displaying green or colorlessness. The blue display unit 12 includes an electrochromic material for displaying blue or colorlessness. Electrochromic materials are classified into inorganic electrochromic materials and organic electrochromic materials. A typical representative of inorganic electrochromic materials is tungsten trioxide $WO_3$ available from the market. While organic electrochromic materials substantially include polythiophenes and their derivatives, viologens, tetrathio fulvalenes, metal phthalocyanine based compounds or the like. Electrochromic materials with viologens as functional materials can also be available from the market too.

The first electrode layer 8 includes spaced electrode strips that may be for example indium tin oxide semiconductor electrode strips. The electrode strips are disposed corresponding to the red display unit 10, the green display unit 11 and the blue display unit 12 respectively. By "disposed corresponding to" means the electrode strips apply voltages to the red display unit 10, the green display unit 11 and the blue display unit 12 respectively and the voltages are applied to the various electrode strips independently.

2. Background Layer

The background layer includes a controllable layer 3 and a third substrate 1. The controllable layer 3 includes an electrochromic material for displaying white or colorlessness. The background layer further includes a second common electrode layer 4 disposed between the controllable layer 3 and the second substrate 5. The background layer further includes a second electrode layer 2 disposed between the controllable layer 3 and the third substrate 1.

The electrochromic materials in display units all have the function of displaying as colorless and transparent, which enables the electrochromic structure in embodiments of the present invention to be applicable to conventional display and fields that need colorless and transparent display such as show windows.

The method for realizing the above-mentioned structure includes following steps.

S1: A first electrode layer 8 is fabricated on a side of the first substrate 9.

If glass substrates are used for the first substrate 9, the second substrate 5 and the third substrate 1 in the present invention, this step may be sputtering the first electrode layer 8 on the first substrate 9. The first electrode layer 8 includes electrode strips with a spacing therebetween. These electrode strips may be for example electrode strips of indium tin oxide semiconductor with a thickness of 150 nanometers, which are transparent.

During fabricating the first electrode layer 8, it is required to know in advance sizes of display units of various colors in the color layer 7 such that the semiconductor electrode strips correspond to display units in the color layer 7 in terms of size. By "disposed corresponding to" means the electrode strips apply voltages to the red display unit 10, the green display unit 11 and the blue display unit 12 respectively and the voltages are applied to various electrode strips independently.

S2: A color layer 7 is fabricated on the first electrode layer 8.

The step S2 includes depositing a black matrix with a thickness (of about 1-5 microns) on the first electrode layer 8 and etching the black matrix into grooves with a width of about 50-100 microns, for example, and the black matrix with a thickness between grooves of about 10-15 microns, for example. Corresponding electrochromic materials are injected into the grooves to form red display units 10, green display units 11 and blue display units 12. The thickness of display units may also be about 10-15 microns to form the color layer 7. The grooves are disposed corresponding to the electrode strips. These electrode strips are indium tin oxide semiconductor electrode strips, for example.

S3: A first common electrode layer 6 and a second common electrode layer 4 are fabricated on two sides of the second substrate 5 respectively.

The first common electrode layer 6 and the second common electrode layer 4 are fabricated on the second substrate 5 may be sputtering a transparent electrode layer on both sides of the second substrate 5.

S4: The first substrate 9 and the second substrate 5 are attached to attach the color layer 7 and the first common electrode layer 6. Before attachment, it is possible to coat sealant on edges of the color layer 7 and the first common electrode layer 6 and then attach them.

S5: A second electrode layer 2 is fabricated on the third substrate 1.

The method of fabricating the second electrode layer 2 is the same as that of fabricating the first common electrode layer 6 and the second common electrode layer 4 except that the second electrode layer 4 may be a transparent semiconductor layer with a thickness of about 50 nm.

S6: A controllable layer 3 is fabricated on the second electrode layer 2; which includes an electrochromic material for displaying a conversion between white and colorlessness or transparency.

S7: The second common electrode layer 4 is attached to the controllable layer 3.

The electrochromic structure fabricated by the embodiments of the present invention may also be applied to fabricate a display apparatus. The electrochromic structure in the embodiments of the present invention can both apply to conventional display and fields that need colorless transparent display such as show windows.

The electrochromic structure of the embodiments of the present invention has clear hierarchy and simple structure, and can be made into a larger display device.

The color layer 7 in the electrochromic structure of the embodiments of the present invention includes color modules including red display units 10, green display units 11 and blue display units 12. Display units in the color modules are more than just red display units 10, green display units 11 and blue display units 12, and may be other colors and hence applicable to various display circumstances.

The number of display units in the color module of the embodiments of the present invention may be adjustable, which can increase display precision and color richness; hence enhancing user experience.

The electrochromic materials in display units all have a function of displaying as colorless and transparent, which enables the electrochromic structure in embodiments of the present invention to be applicable to conventional display and fields that need colorless and transparent display such as show windows.

The above implementations are only for explaining the present invention rather than limiting the present invention. It is understood that those of ordinary skill in the art can further make various changes and modifications without departing from the spirit and scope of the present invention and the present invention is also intended to encompass these changes and modifications and any equivalents thereof falling into the scope of claims of the present invention.

What is claimed is:

1. An electrochromic structure, comprising:
   a display layer comprising a first substrate, a color layer, a first common electrode layer and a second substrate sequentially; and
   a background layer comprising an integral controllable layer, a second common electrode and a third substrate, wherein the second common electrode layer is provided between the controllable layer and the second substrate;
   wherein the integral controllable layer comprises electrochromic material for displaying a conversion between white or colorlessness upon being controlled integrally, and the display layer is over the background layer.

2. The structure according to claim 1, wherein the display layer further comprises a first electrode layer provided between the first substrate and the color layer.

3. The structure according to claim 2, wherein the first electrode layer comprises electrode strips with a space therebetween.

4. The structure according to claim 1, wherein the background layer further comprises a second electrode layer provided between the controllable layer and the third substrate.

5. The structure according to claim 2, wherein the color layer comprises color modules.

6. The structure according to claim 5, wherein the color module each comprise a red display unit, a green display unit and a blue display unit.

7. The structure according to claim 6, wherein the red display unit comprises an electrochromic material for displaying red or colorlessness.

8. The structure according to claim 6, wherein the green display unit comprises an electrochromic material for displaying green or colorlessness.

9. The structure according to claim 6, wherein the blue display unit comprises an electrochromic material for displaying blue or colorlessness.

10. The structure according to claim 6, wherein the first electrode layer comprises spaced electrode strips, and the electrode strips are provided corresponding to the red display units, the green display units and the blue display units respectively.

11. A method of fabricating an electrochromic structure, comprising:
    forming a first electrode layer on a side of the first substrate;
    forming a color layer on the first electrode layer;
    forming a first common electrode layer and a second common electrode layer on two sides of the second substrate respectively;
    attaching the first substrate and the second substrate to attach the color layer and the first common electrode layer together;
    forming a second electrode layer on the third substrate;
    forming a controllable layer integrally on the second electrode layer; and
    attaching the second common electrode layer and the controllable layer;
    wherein the controllable layer includes electrochromic material for displaying a conversion between white and colorlessness upon being controlled integrally.

12. The method according to claim 11, wherein fabricating of the color layer on the first electrode layer comprises:
    depositing a black matrix of a thickness on the first electrode layer;
    etching the black matrix into grooves with a width corresponding to the electrode strips; and
    injecting electrochromic materials into the grooves to form red display units, green display units and blue display units, so as to form the color layer.

13. The structure according to claim 3, wherein the electrode strips are electrode strips of indium tin oxide semiconductor.

14. A display apparatus comprising the electrochromic structure according to claim 1.

15. The electrochromic structure according to claim 1, wherein part of the color layer is made of electrochromic material.

\* \* \* \* \*